Patented June 16, 1931

1,810,560

UNITED STATES PATENT OFFICE

BENJAMIN S. GARVEY, OF AKRON, OHIO, ASSIGNOR TO THE B. F. GOODRICH COMPANY, OF NEW YORK, N. Y., A CORPORATION OF NEW YORK

COMPOSITE PRODUCT AND METHOD OF MAKING THE SAME

No Drawing. Application filed February 9, 1929. Serial No. 338,886.

This invention relates to the art of manufacturing rubber and has as its object to provide a method whereby the surface of rubber articles or of rubber coatings may be protected from the deteriorating effect of powerful oxidizing agents, or of certain solvents and swelling agents.

It is well known that rubber, although remarkably inert respecting other reagents, is extremely sensitive to the action of strong oxidizing agents, such as nitric acid, chromic acid, ozone, hydrogen peroxide, potassium chlorate, etc., which either destroy the rubber completely or cause the loss of substantially all of its strength and resiliency. It is also known that rubber absorbs rapidly, and holds tenaciously, many organic compounds, particularly the petroleum hydrocarbons such as gasoline, kerosene, lubricating oil, etc., to which many rubber products are necessarily exposed. The result of such absorption is that the rubber swells and becomes warped, buckled, or otherwise distorted, and loses most of its strength. It is therefore very desirable to be able to treat rubber in such a manner as to enable it to withstand the action of oxidizing agents, petroleum hydrocarbons, etc., without deterioration.

Heretofore attempts have been made to modify rubber, making it resistant to oxidizing agents and oils, by providing it with a surface of rubber chloride. Pure rubber chloride, which may be prepared, for example, by passing chlorine into a rubber solution or by treating solid rubber with chlorine under pressure, is extremely resistance to oxidation and is practically unaffected by petroleum hydrocarbons, but is unfortunately quite brittle. If the surface of a mass of soft rubber is chlorinated to a sufficient depth to render it resistant to oxidation, the brittle surface cracks upon the slightest shock or distortion, permitting the penetration of the oxidizing or other agent, through the cracks, to the soft rubber underneath. On the other hand, if a coating of chlorinated rubber is applied to the surface of soft rubber, either in the solid form or in solution, the coating does not adhere to the underlying soft rubber.

I have discovered that an adherent coating of rubber chloride, which may, if desired, contain a plasticizer to reduce its brittleness, may be affixed to soft rubber by chlorinating the surface of the soft rubber and then applying the rubber chloride, a solution of rubber chloride being employed as an adhesive; and that rubber with such a coating of rubber chloride not only resists mechanical shocks admirably, but is extraordinarily resistant to oxidation, etc.

In the practice of this invention the surface of the soft rubber, which may or may not be vulcanized, or contain pigments, fillers, softeners, etc., is conveniently chlorinated by exposing it to chlorine gas, preferably in the presence of benzene vapor or some other equivalent rubber solvent to assist in the penetration of the chlorine. In certain cases it may be found desirable, instead of chlorinating the rubber, to treat it with a solution of hydrogen chloride in water, acetone, ethyl acetate, etc., which converts the surface of the rubber to rubber hydrochloride. The rubber hydrochloride resembles rubber chloride in being chemically saturated, or nearly saturated, and therefore very resistant to oxidation, but contains lower proportions of chlorine and is not as brittle as the chloride. The adhesion of rubber chloride to rubber hydrochloride may, in some cases, be less than its adhesion to a second rubber chloride surface, but is sufficient for the purposes of this invention. The rubber may even be acted upon by a mixture of chlorine and hydrogen chloride, or first by hydrogen chloride and then by chlorine, producing a surface with properties intermediate between those of rubber hydrochloride and rubber chloride.

The coating of rubber chloride may be applied to the chlorinated surface of the soft rubber either in the form of a solid sheet, or, if the surface is irregular, or if only a very thin layer is desired, in solution in an appropriate solvent. If the solid rubber chloride is employed, the surfaces which are to come in contact should be coated with a solution of rubber chloride, or at least be moistened with a solvent for rubber chloride, before being pressed together. If the rubber chloride is applied in solution, say in benzene, tetrachlorethane or carbon tetrachloride, it is only necessary to apply a sufficient number of coats to give the desired thickness to the protective layer. The solution may be applied by any of the well-known methods of applying liquids to solids, for example by dipping, brushing or spraying.

For maximum resistance to petroleum hydrocarbons or oxidizing agents it will usually be preferred to employ a substantially pure rubber chloride for the final coating. However, the physical properties of the coating, particularly its hardness and extensibility, may readily be modified, and its brittleness thereby reduced, by admixing the rubber chloride with a plasticizing agent. The plasticizing agent should preferably be a nonvolatile liquid which is miscible with rubber chloride, soluble in the same solvents and unaffected by the same reagents as the rubber chloride. Since it is very difficult to meet all these conditions at once, compromises may have to be made. A plasticizer which would be satisfactory under certain conditions could not be used at all under others. For example, the following classes of substances may be employed to plasticize chlorinated rubber: aromatic hydrocarbons, such as xylene or naphthalene; chlorinated aromatic hydrocarbons, such as dischlorbenzene, chlordiphenyl or chlornaphthalene; nitrated aromatic hydrocarbons, such as dinitrotoluene, dinitrochlorbenzene, nitro-diphenyl-ether, nitro-anisol or nitronaphtalene; amines, such as aniline or nitronaphthylamine; esters, such as dibutyl-phthalate, tricresyl-phosphate or benzyl-benzoate; fatty oils or their derivatives, such as cottonseed oil, castor oil, blown linseed oil or chlorinated China wood oil; etc. Obviously the choice of the plasticizing agent or mixture of plasticizing agents must be governed by the properties desired in the finished coating. For example, if a coating resistant to nitric acid is desired, the plasticizing agent should also be resistant to and insoluble in nitric acid. The proportion of plasticizing agent employed will depend upon the degree of resiliency desired in the coating. Soft, rubbery coatings are obtained with equal parts of rubber chloride and plasticizing agent, while tough, horny coatings are obtained with smaller proportions of plasticizer. For some purposes it may also prove desirable to substitute rubber hydrochloride for part or all of the rubber chloride, or to employ a chlorinated rubber hydrochloride.

A coating composition which will resist dilute nitric acid indefinitely, and concentrated nitric acid for several weeks or months, depending on the thickness of the coating, is obtained by dissolving 100 parts by weight of rubber chloride, 50 parts of o-nitro-diphenyl-ether, 25 parts of dinitrobenzene, and 25 parts of dinitrotoluene in about 1000 parts of benzene. Several coats of the solution are applied to a rubber article, the surface of which has been chlorinated.

As a specific example of the practice of this invention, a metal container for concentrated nitric acid is completely coated with a layer of soft rubber, which is caused to adhere firmly to the metal by any of the well-known methods of adhering rubber to metal. The rubber is then exposed to an atmosphere of chlorine gas containing a small amount of benzene vapor for a period of about 12 hours. The chlorinated surface of the rubber is then painted with five coats of a solution of 100 parts of rubber chloride and 25 parts of o-nitro-diphenylether in 700 parts of benzene. The coating will resist the action of concentrated nitric acid almost indefinitely.

A coating which will resist the action of petroleum hydrocarbons, such as gasoline, may be prepared by dissolving 100 parts of rubber chloride and 100 parts of blown linseed oil in 1000 parts of benzene. The solution is applied to a chlorinated surface of a soft rubber article as in the previous example.

It will be understood that the term "rubber", unless otherwise limited, is employed in the appended claims in a generic sense to include vulcanized or unvulcanized soft rubber, gutta percha, balata, synthetic rubber, reclaimed rubber, etc., whether or not admixed with fillers, pigments, softeners, etc. The term "halogenated rubber" is likewise employed in a generic sense to include chemically saturated derivatives of rubber containing substantial proportions of a halogen, such as rubber chloride, rubber bromide, rubber iodide, rubber hydrochoride, rubber hydrobromide, chlorinated rubber bromide, chlorinated rubber hydrochloride, etc. The term "rubber chloride", on the other hand, is limited to the product of the direct chlorination of rubber.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of making a composite product which comprises halogenating a rubber surface, and applying a layer of halogenated rubber thereto.

2. The method of making a composite product which comprises halogenating a rubber surface and applying a layer of chlorinated rubber thereto.

3. The method of making a composite product which comprises chlorinating a rubber surface and applying a layer of chlorinated rubber thereto in the presence of a solvent for chlorinated rubber.

4. The method of making a composite product which comprises chlorinating a rubber surface and applying thereto a solution comprising chlorinated rubber.

5. The method of making a composite product which comprises chlorinating a rubber surface and applying thereto successive coats of a solution comprising chlorinated rubber.

6. The method of making a composite product which comprises chlorinating a rubber surface and applying thereto a solution comprising rubber chloride.

7. The method of making a composite product which comprises chlorinating a rubber surface and applying thereto a solution comprising chlorinated rubber and a plasticizing agent.

8. The method of making a composite product which comprises chlorinating a rubber surface and applying thereto a solution comprising chlorinated rubber and a substantially non-volatile, liquid plasticizing agent.

9. The method of making a composite product, which comprises chlorinating a vulcanized soft rubber surface and applying thereto a solution comprising chlorinated rubber plasticized with a substantially non-volatile nitrated aromatic hydrocarbon derivative.

10. The method of making a composite product which comprises chlorinating a vulcanized soft rubber surface and applying thereto a solution comprising rubber chloride and o-nitro-diphenylether.

11. The method of making a composite product which comprises exposing a rubber surface to an atmosphere of chlorine and applying to the chlorinated surface a solution comprising chlorinated rubber.

12. The method of making a composite product which comprises exposing a vulcanized soft rubber surface to an atmosphere of chlorine and applying to the chlorinated surface a solution comprising a rubber chloride and a plasticizing agent.

13. A composite product comprising a rubber base portion with an integral chlorinated surface, and a coating comprising chlorinated rubber and a plasticizing agent adhering firmly thereto.

14. A composite product comprising a vulcanized soft rubber base portion with an integral chlorinated surface, and a firmly adherent coating comprising rubber chloride and a substantially non-volatile, liquid plasticizing agent.

15. A composite product comprising a vulcanized soft rubber base portion with an integral chlorinated surface, and a firmly adherent coating comprising rubber chloride plasticized with a substantially non-volatile nitrated aromatic hydrocarbon derivative.

16. A composite product comprising a vulcanized soft rubber base portion with an integral chlorinated surface, and a firmly adherent coating comprising rubber chloride plasticized with o-nitro-diphenylether.

In witness whereof I have hereunto set my hand this 2nd day of February, 1929.

BENJAMIN S. GARVEY.